Patented Dec. 15, 1953

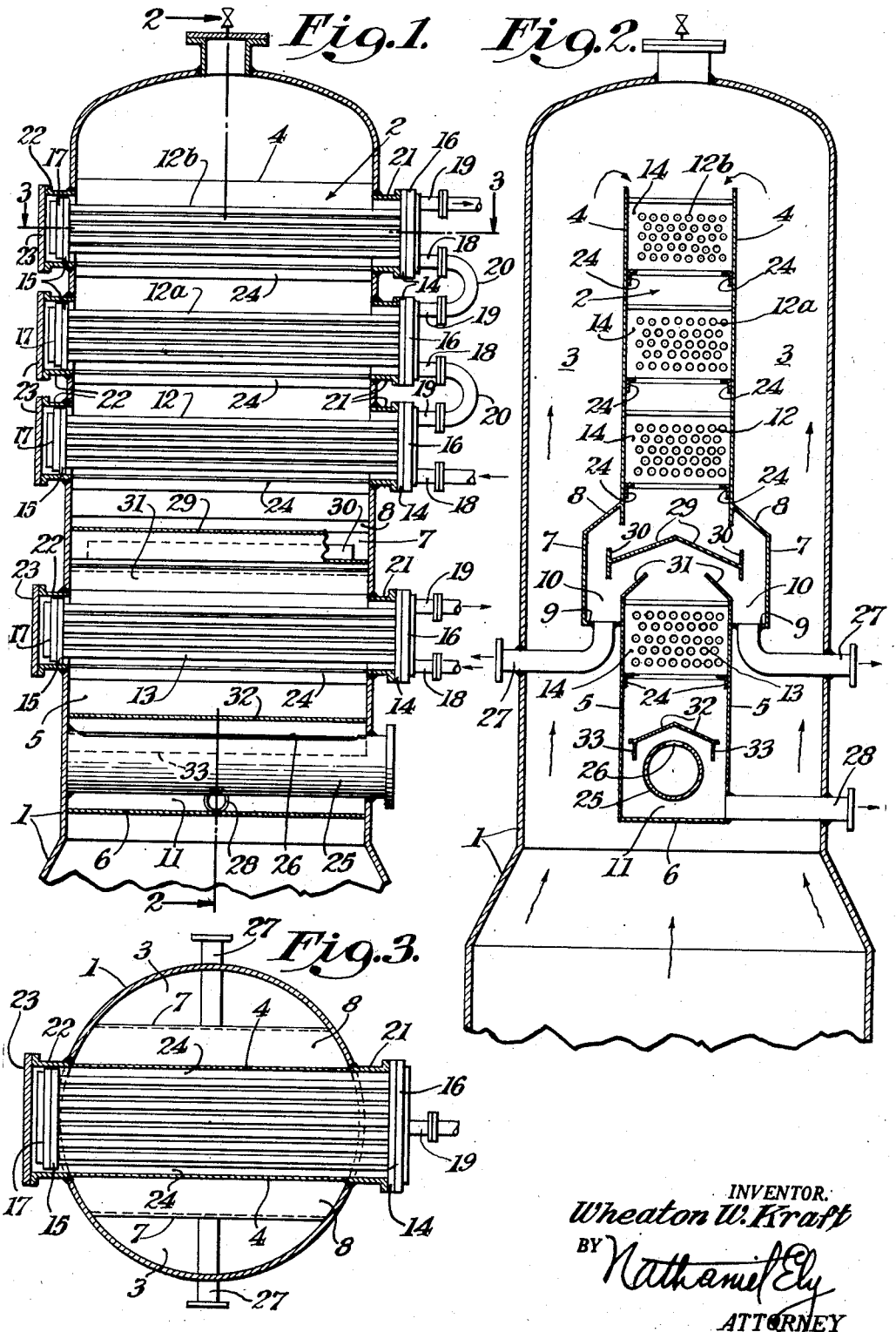

2,662,850

UNITED STATES PATENT OFFICE 2,662,850

CONDENSING SYSTEM FOR DISTILLATION COLUMN

Wheaton W. Kraft, Scarsdale, N. Y., assignor to The Lummus Company, New York, N. Y., a corporation of Delaware Application September 7, 1950, Serial No. 183,559

3 Claims. (Cl. 202—158)

This invention relates to improvements in a surface condensing system of a type employed within the upper portion of a distillation column to condense vapors rising within the column. More particularly, the invention is concerned with such a system designed to perform partial or staged condensing of the vapors efficiently.

An important object of the invention is to provide a condensing apparatus of the aforesaid type embodying improved features of design contributing to efficient performance and ready servicing.

A further object of the invention is to provide such an apparatus embodying a first-stage condenser section and a second-stage condenser section in an improved correlation and with improved means for segregating the condensate from the two sections and drawing them off separately, in order to avoid undesired cooling of the first-stage condensate.

A still further object is to provide an improved arrangement of the condensing apparatus within a distillation column.

Further objects and advantages of the invention will appear from the following description taken in connection with the accompanying drawing in which:

Fig. 1 is a vertical sectional view of an upper portion of a distillation column with the improved condensing apparatus embodied therein.

Fig. 2 is a vertical section on the line 2—2 of Fig. 1.

Fig. 3 is a horizontal section on the line 3—3 of Fig. 1.

According to the invention, the vapors rising from the lower portion of the column are caused to flow upwardly through vertical passages at opposite sides of an enclosed condensing zone within the upper portion of the column and then downwardly through said zone. Within the zone a plurality of tube-bundle units are arranged in vertical succession in the path of the vapors descending within the zone. These units have means for circulating a cooling fluid through their tubes and they constitute a first-stage surface condensing section. Spaced below said first-stage section there is a second-stage surface condensing section comprising a similar tube bundle unit adapted to have cooler fluid circulated through its tubes. Between said first and second stage sections there are baffle means to intercept the condensate from the first-stage section and divert it to one or more collecting wells whence it is withdrawn from said zone and from the column. Thereby, said condensate is prevented from reaching the second-stage condensing section and kept from undesired cooling thereby. The said baffle means also directs vapors which have not been condensed in the first condensing stage to the cooler second-stage section, and the condensate from the latter is collected within the bottom of the zone and withdrawn to the exterior of the column. Vapors uncondensed in the second-stage condensing step are withdrawn through a gas offtake, and baffle means prevent exit of condensate through said offtake. Said two baffle means are also devised to remove entrained condensate from the vapors.

Provision is also made for convenient servicing of the apparatus. For that purpose, each of said tube bundle units is removable from the condensing zone and from the column independently of the other units.

In the drawing, I designates a distillation column or tower whose upper portion may, as shown, be of reduced diameter. The lower portion or body of the column, not shown, may contain the usual vapor-liquid contact devices such as bubble decks, shower decks, or the like, or the column may be part of a unit such as that disclosed in a copending U. S. patent application of Ward J. Bloomer, Serial Number 98,975, now Patent No. 2,560,075, filed June 14, 1949, and entitled "Evaporator." In the present disclosure, the condensing system is embodied in the reduced upper portion of the column and is particularly useful in a column operated under reduced pressure or vacuum.

Within the upper portion of the column I there is a vertically elongated chamber 2 defining a confined condensing zone. In horizontal section said chamber extends diametrically across the column and is narrow enough to afford two vertical vapor passages 3 at opposite sides of the chamber. A pair of parallel walls 4 form opposite sides of the upper portion of the chamber, and another pair of parallel walls 5 form opposite sides of the lower portion of the chamber and, in the present instance, are in the same vertical planes as the walls 4 and spaced below the latter. A bottom wall 6 connects the lower edges of the walls 5. At an intermediate position in the height of the chamber, opposite, outwardly spaced vertical walls 7, inclined upper walls 8 and bottom walls 9 form an enlargement of the chamber. Lower margins of the walls 4 extend into said enlargement. The walls 9 are at a level below the upper edges of the walls 5 so that the chamber enlargement forms a pair of oppositely disposed condensate collecting wells 10 whose purpose will be explained hereinafter. The bottom portion of the chamber forms another condensate collecting well 11. All of said walls are secured in sealed connection with the column and in sealed connection with one another, by welding or otherwise, to form a casing open only at the top to the interior of the column.

Within the upper portion of the chamber space, between the walls, 4 there is a plurality of spaced tube bundle units. In the present instance, there are three of these units 12, 12a and 12b in vertical succession and, within the chamber space between the upper portions of the walls 5, there is a tube bundle unit 13. Said units are all of similar construction. Each comprises a bank of tubes secured at their opposite ends to tube sheets 14 and 15. These may be rectangular, as shown, or of any suitable shape. Channel or header members 16 and 17 are releasably secured to said tube sheets respectively, and the channel 16 has a flanged inlet nozzle 18 and a flanged outlet nozzle 19 for circulating cooling fluid through the tubes of the bank. The channels may be provided with any suitable arrangement of pass partitions to obtain the desired number of passes in the circulation. Flanged elbow pipes 20 are releasably connected to appropriate nozzles of the three upper bundle units to circulate the cooling fluid through the units 12, 12a and 12b in succession.

Similar mountings are provided for the four tube bundle units to support them in substantially horizontal position and enable them to be withdrawn endwise from the condensing chamber and the column. The mounting for each unit includes a pair of horizontally aligning nozzle-like frames 21 and 22 welded to opposite sides of the column and flanged at their outer ends. A blind flange or cover 23 is releasably secured to the flanged end of the nozzle 22, and the channel 17 of the tube bundle is slidably received in said nozzle. The channel 16 of the bundle is releasably secured to the outer flanged end of the nozzle 21. Track members 24 which may, as shown, be angle irons, extend between the nozzles 21 and 22 and are secured to the adjacent walls 4 or 5, and to the column 1, if need be, by welding or otherwise. When the outside piping is detached from the nozzles 18 and 19 and the channel 16 is released from the frame or nozzle 21 the bundle may be withdrawn through nozzle 21 with the inner tube sheet 15 riding upon the tracks 24. Thus, each tube bundle unit may be removed and inserted independently of the other units.

A gas or vapor offtake pipe 25 extends substantially horizontally through the lower portion of the condensing chamber and has a flanged end protruding from one side of the column. The opposite end of said pipe is welded blind to the column, and the pipe has a gas entrance slot 36 at the upper side thereof and extending along most of the length of the pipe within the condensing chamber. The pipe 25 forms the exit for uncondensed vapors and gases and suction may be applied thereto to obtain a required vacuum within the column.

From each of the condensate collecting wells 10 a draw-off or drain pipe 27 leads to the exterior of the column and is flanged at its outer end. Another draw-off or drain pipe 28 leads from the bottom well 11 to the exterior of the column and is also flanged at its outer end.

Between the tube bundle 12 and the tube bundle 13 and within the enlarged portion of the condensing chamber there is a baffle assembly to intercept condensate falling from the bundles 12, 12a and 12b and divert it to the two side wells 10. The baffle assembly includes a pair of joined downwardly diverging baffle plates 29 having curbs 30 along their lower edges forming gutters. The ends of said curbs terminate short of the inner wall of the column to permit the condensate to drain from the gutters into the wells 10. The combined width of the baffle plates 29 substantialy exceeds the width of the tube bundles thereabove so as to catch all of the condensate from the bundles. Beneath the baffle plates 29, the walls 5 have upwardly converging margins forming baffles 31 and the curbs 30 extend downwardly below the level of the upper edges of the baffles 31.

Between the tube bundle 13 and the gas offtake pipe 25 there is baffle means to exclude condensate from said pipe. Said means includes a pair of joined, oppositely sloping baffle plates 32 overlying said pipe and spaced thereabove and having at their lower edges depending baffle portions 33 which extend substantially below the level of the entrance slot 26 of said pipe. The plates 32 catch the condensate from the bundle 13 and divert it into the well 11. All of the baffle elements described are welded or otherwise suitably secured at their opposite ends to the wall of the column.

In the operation of the column and the condensing system a desired vacuum may be obtained within the column by withdrawal of gaseous media through the offtake pipe 25 located within the lower portion of the condenser chamber 2. Assuming, for example, that the charge to the column is reduced crude petroleum and that gas oil for catalytic cracking is the condensate desired from the condensing system, the cold liquid charge enroute to a heater, not shown, is continuously passed, through the tubes of the first-stage bundle units 12, 12a and 12b, in the order named. Said charge enters through the nozzle 18 of the bundle 12 and leaves through the nozzle 19 of the unit 12b. A separate, colder liquid such as water, for example, is continuously circulated through the tubes of the second-stage condensing unit 13. The vapors of the heated charge within the column rise through the passages 3 to the open top of the condenser chamber 2 and pass downward through said chamber over the tubes of the first-stage condenser units. Since the flow of the cooling liquid is, in general, upward through said units in succession and the flow of the vapors within the chamber is downward countercurrent to the flow of the cooling liquid, heat exchange is facilitated.

Heavier or higher boiling components of the vaporized gas oil are condensed on the tubes of the first-stage condensing section comprising the units 12, 12a and 12b, the condensate rains upon the sloping baffles 29 and the gutters at the lower ends of said baffles catch the condensate and discharge into the wells 10. Said discharge occurs at the ends of the gutters and out of the path of most of the uncondensed vapors and gases on their way to the second-stage condenser section comprising the tube bundle unit 13. The discharge is also concentrated in relatively thick streams to avoid entrainment by the relatively small portion of the gases or vapors contacting the discharge. Thereby, entrainment of the condensate by said vapors is minimized. In addition, condensate entrained above the baffles 29 by the vapors is thrown out by abrupt changes in the course of the vapors in passing under the lower margins of the walls 4, around the depending portions of the curbs 30, upwardly over the baffles 31 and downwardly between the latter to the condenser unit 13. The liquid thus separated from the vapors is shed into the wells 10.

Lighter or lower boiling components of the vaporized gas oil are condensed on the tubes of the unit 13 and the condensate falls upon the baffles 32 and is shed by them into the lower well 11 so as to intercept and divert the condensate from the entrance slot 26 of the offtake conduit or pipe 25. Uncondensed vapors or gases are withdrawn through the pipe 25 and in order to reach the entrance slot thereof they are constrained to pass under the depending baffle margins 33 and then upwardly to the slot. Abrupt change in the course of the vapors causes entrained condensate to be thrown out and shed into the well 11.

Effective segregation of the condensates from the two condensing stages is obtained. Condensate from the first condensing stage is effectually prevented from reaching the colder second stage and becoming cooled undesirably. This condensate is withdrawn separately through the pipes 22 for cracking or other processing while the condensate from the second condensing stage is withdrawn through the pipe 28 for heating and delivery to a cracking or other processing step. Assume, for example, that the temperature of the first-stage condensate is in excess of 500° F. and that of the second-stage condensate is around 250° F. and assume further that the discharge through the offtake pipes 27 is three times that of the discharge through the pipe 28. Then, it will be appreciated that many millions of B. t. u.'s per hour can be saved by practice of the two-condensing steps as provided for by the invention.

It will be seen from the foregoing that the apparatus is designed for maximum efficiency and ready servicing.

It is of course to be understood that the present disclosure of the invention is merely illustrative and in nowise limiting and that the invention comprehends such modifications as will fall within the scope of the following claims. It will be understood also that the utility of the apparatus is not limited to employment in a column operated under vacuum nor to one operating upon a reduced crude charge and in which the desired condensate is gas oil.

I claim:

1. In a distillation column, condensing apparatus comprising a chamber within an upper portion of the column and having opposite side walls inwardly spaced from opposite sides of the column to afford free passages for ascending vapors at opposite sides of the chamber, said chamber being open at the upper portion only thereof for admission of vapors from both of said passages, a vapor offtake conduit leading from a lower portion of the chamber to the exterior of the column, first-stage condenser tubing within the chamber and in the path of descent of the admitted vapors, means to circulate cooling fluid through said tubing, means forming a first-stage condensate-collecting well within the chamber, a drain conduit leading from said well to the exterior of the chamber, second-stage condenser tubing within the chamber and spaced below said first-stage tubing, means to circulate a cooling fluid through said second-stage tubing, a condensate-collecting tray within the chamber underlying the first-stage tubing and overlying the second-stage tubing and above the level of said well, to catch the condensate falling from the first-stage tubing and discharge it to said well, there being space within the chamber for flow of vapor past said tray to the second-stage tubing, curbing on the tray to divert said discharge of condensate from the tray out of the path of the vapors flowing from the first-stage tubing to the second-stage tubing, baffle means in said path of the vapors to remove entrained first-stage condensate therefrom and divert it to said well, the chamber having within the lower portion thereof a well to collect the condensate falling from the second-stage tubing, and a condensate drain leading from said second-stage well to the exterior of the chamber.

2. In a distillation column, the condensing apparatus as claimed in claim 1, wherein the said chamber is laterally enlarged at an intermediate point in its height to form a pair of first-stage condensate collecting wells within the space at opposite sides of the chamber and each according to the well claimed in claim 1 and having drain connection with the exterior of the chamber, and the said condensate collecting tray has portions oppositely inclined downwardly toward said wells and said curbing extends along the lower edges of said portions.

3. In a distillation column, the condensing apparatus as claimed in claim 2, wherein the said baffle means comprises baffles depending from the outer edges of said oppositely inclined portions of the condensate-collecting means, and baffles beneath said oppositely inclined portions and converging upwardly over said second-state tubing from the inner sides of said wells.

WHEATON W. KRAFT.

References Cited in the file of this patent

UNITED STATES PATENTS

| Number | Name | Date |
|---|---|---|
| 865,933 | Ponomarew | Sept. 10, 1907 |
| 1,519,719 | Brandon | Dec. 16, 1924 |
| 1,541,227 | Kelly | June 9, 1925 |
| 1,670,743 | Schneible | May 22, 1928 |
| 1,919,599 | Schonberg | July 25, 1933 |
| 1,939,392 | Gray et al. | Dec. 12, 1933 |
| 2,167,028 | McGovern | July 25, 1939 |
| 2,342,838 | Brunjes | Feb. 29, 1944 |
| 2,578,925 | Davis | Dec. 18, 1951 |